Figure 1:
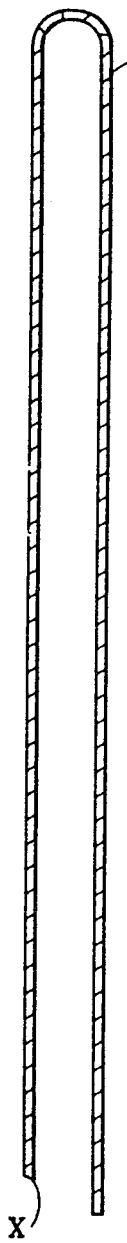

United States Patent [19]
Savard

[11] Patent Number: 5,277,347
[45] Date of Patent: Jan. 11, 1994

[54] SMALL GAME HOLDER

[76] Inventor: Paul Savard, 120 Woodlawn Dr., Barre, Vt. 05641

[21] Appl. No.: 959,411

[22] Filed: Oct. 13, 1992

[51] Int. Cl.⁵ .............................................. A01K 29/00
[52] U.S. Cl. .................................. 224/103; 224/253; 224/250; 24/115 H; 24/128
[58] Field of Search ............... 224/103, 253, 250, 921; 24/115

[56] References Cited

U.S. PATENT DOCUMENTS

| | | | |
|---|---|---|---|
| 825,753 | 7/1906 | Paul | 224/250 |
| 3,188,130 | 6/1965 | Pietrowicz | 224/921 |

Primary Examiner—Linda J. Sholl
Attorney, Agent, or Firm—John J. Welch, Jr.

[57] ABSTRACT

The instant invention consists of a piece of heavy string eighteen or so inches long that is looped about itself, tied at one end of the loop and then subjected to a threading of both sides of the loop through a plurality of compressible, movable small cord locks before the tying of another intermediate knot serving thereby to create a sub-loop between two knots between which is a plurality of compressible, movable small cord locks. It moreover consists of another compressible, movable small cord lock through which both sides of the portion of the looped heavy string beyond the intermediate knot are threaded prior to the tying of the final knot at the other end of the initial heavy string loop to create a second sub-loop and complete assembly of the invention.

8 Claims, 1 Drawing Sheet

SMALL GAME HOLDER

CROSS REFERENCES TO PRIOR APPLICATIONS

There are no prior or pending applications related to this application.

FEDERALLY SPONSORED RESEARCH AND DEVELOPMENT

There is no involvement with any federally sponsored research and development.

BACKGROUND OF THE INVENTION

1. Field of Invention

The instant invention relates to the art of small game holding loops. Classes 24 (clasps); Subs: 129A, 129C, 129D, 129R, 300 and 405; 224 (article carriers); Sub 103; and D3 (travel goods) Sub 100 comprise the perimeters of the field of the instant invention.

2. Possible Prior Art

The following patents reflect features that possibly remotely resemble the instant invention.

| Inventor | Invention | Pat. No. | Date |
| --- | --- | --- | --- |
| M.L. Clevett, Jr., et al | Bag Closure Fastener | 2,832,116 | 4/28/58 |
| H.E. Lien | Fish Stringer | 2,760,700 | 8/28/56 |
| Kunio Hara | Fastener for String | 4,506,417 | 3/26/85 |
| A. Genaille | Bracelet | 1,419,370 | 6/13/22 |
| V.L. Graves | Multiple Section Fish Stringer | 2,698,117 | 12/28/54 |
| R.E. Gibney | Small Game Carryall | 2,788,164 | 4/9/57 |
| O.C. Guilford | Fish Stringer or Holder | 878,626 | 2/11/08 |
| J.D. Baldridge | Game Stringer | 2,794,582 | 6/4/57 |
| T. Hanson | Fish Stringer | 2,424,658 | 7/29/47 |

A SUMMARY OF THE INVENTION

1. A Description of the Invention

The instant invention consists of, to begin with, eighteen inches or so of heavy string ultimately turned into a loop then eventually knotted at each of the ends of the loop as well as knotted for an intermediate knot a couple of inches or so from one end as well, thus creating two sub-loops. On the heavy string, moreover, there are to be found five or six, more or less, affixed compressible, movable small cord locks through each of which both sides of the looped heavy string are threaded. Squeezing each of these cord locks enables a person to move each one so squeezed back and forth along the knotted heavy string. After the rounded end of the loop of heavy string, denominated hereafter throughout as the first end has been tied into a knot and after the aforementioned plurality of small cord locks have been positioned on the string as noted above, a second or intermediate knot as mentioned above is then tied in the string to thus create a first sub-loop in the piece of heavy string. The portion of the heavy string knotted at the other end, hereafter the second end together with the intermediate knot that has been tied in the heavy string prior to the making of the knot in the second end forms a second sub-loop through which a hunter's belt is then threaded. Squeezing the one of the small cord locks affixed between the knotted second end and the intermediate knot proximate thereto enables a hunter to move that small cord lock to a point in tight proximity to his/her belt to thus hold the invention tight and secure to that hunter's belt. The invention so held by the hunter's belt then hangs down the side of the hunter's hip. As small game animals and birds are caught, the hunter simply places one leg of the animal or bird into a portion of the sub-loop created by the intermediate knot and the other or first knotted end, to wit, the portion between the intermediate knot and the first one of the five or six small cord locks located on the first sub-loop or the portion between two of these five or six small cord locks or the portion between the last one of these small cord locks and the first knotted end. The hunter then squeezes one of these small cord locks and moves the cord lock to a point calculated to tightly hold the leg of the caught animal or bird secure against either the intermediate knot or the one of the other small cord locks located just above it, as the case may be while the hunter continues to walk about.

2. The Object of the Invention

The object of the instant invention is to provide small game hunters with a ready and convenient means for carrying about the carcasses of small game apprehended by such hunters during the course of hunting. It also eliminates the need for hunters without small game vests to consequently carry such units of caught small game continuously in one hand while walking about within wooded areas where small game is available to be found. If a hunter is required to continuously carry caught small game in one hand, then, it is relatively difficult indeed for that hunter to quickly ready his/her shotgun being carried in the other hand to properly yet quickly fire at mobile small game often in view for only brief instances. In fact, the instant invention removes entirely the need for a small game hunter to wear a small game vest, often bulky, hot to wear and uncomfortable, while hunting especially in south central states where it's often quite hot and humid during the autumnal hunting season. In view of the foregoing, the instant innovative device is indeed as useful as it is unique.

A BRIEF DESCRIPTION OF THE DRAWINGS

1. FIG. 1 is a perspective view of the heavy string component of the invention configured into a loop.

Figure 2:
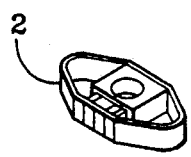

2. FIG. 2 is a perspective view of one of the equivalent compressible, movable small cord lock components of the invention.

Figure 3:
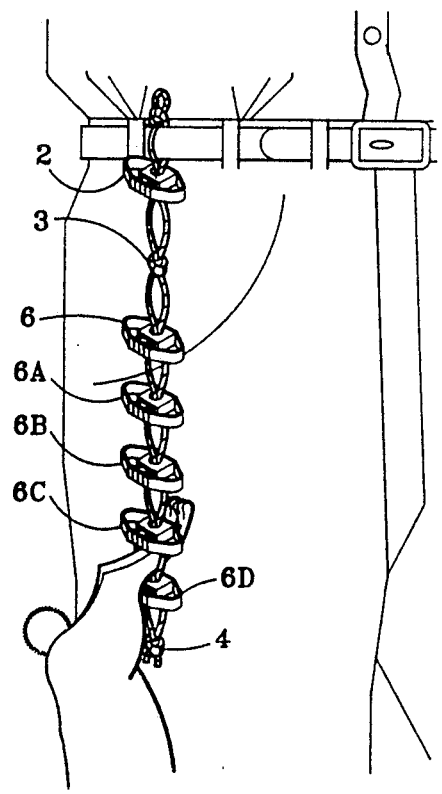

3. FIG. 3 is a perspective view of the heavy string component of the invention configured into a loop showing a first end knotted, the other a second end knotted and an intermediate knot in proximity to the second one of the two ends of the loop.

Figure 4:
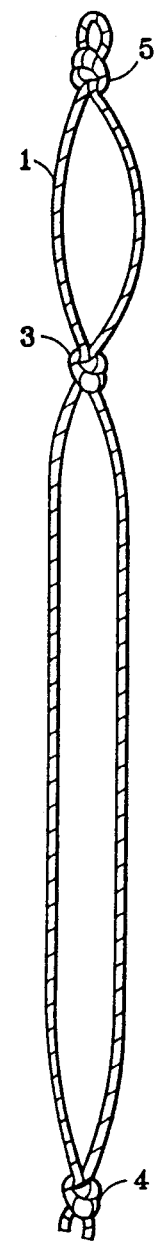

4. FIG. 4 depicts in perspective view what is shown in FIG. 3 but additionally shows a small cord lock through which both sides of the sub-loop between the second knotted end and the intermediate knot are threaded and further shows a plurality of small cord locks through which both sides of the sub-loop between the first knotted end and the intermediate knot are threaded.

Figure 5:
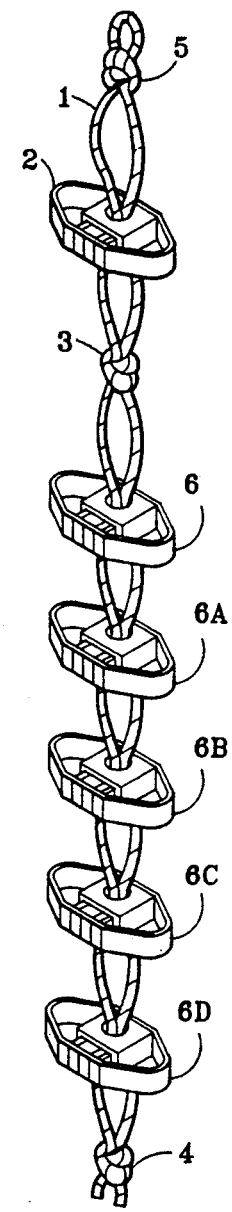

5. FIG. 5 shows a hunter wearing a fully assembled small game holder.

A DESCRIPTION OF THE PREFERRED EMBODIMENT

FIG. 1 shows heavy string 1 which is configured into a loop. Knot 4 as shown in FIG. 3 and FIG. 4 is first tied at the first end of the loop of heavy string 1, to wit, the end labeled X in FIG. 1. Intermediate knot 3 as shown in FIG. 3 and FIG. 4 is then tied in heavy string 1 after first threading both sides of the loop of heavy string 1 now knotted at the first end through a plurality of compressible movable small cord locks, 6, 6A and 6B, an exemplar one of which is shown in FIG. 2 as compressible, movable small cord lock 2. At this juncture, there exists created the first of what will ultimately be two sub-loops with knotted ends that characterize the instant invention. Now, both sides of the second sub-loop with knotted ends to be created by ultimately tying knot 5 as seen in FIG. 3 and FIG. 4 are threaded through compressible movable small cord lock 2 and then knot 5 is tied at the second end of the initial loop of heavy string thus creating the second sub-loop with knotted ends of the instant invention now fully assembled. The invention is then worn by a small game hunter as shown in FIG. 5 so that it hangs from his belt through the sub-loop created by tying knot 3 and then knot 5 and it is so worn so that it hangs down along the side of that hunter's hip. Small cord lock 2 is adjusted so as to hold the invention snug against the hunter's belt. Small cord locks, 6, 6A and 6B are adjusted as units of small game are caught so as to tightly hold a leg of each caught unit of small game taunt so that the hunter can walk about with a shotgun in one hand and one hand free while hunting without any need to wear a hunting vest.

The foregoing is not meant to limit the scope of the invention in respect of the variants of the invention that could be, for example, created using rope or twine or flexible wire instead of heavy string or using varied forms of cord locks and in such regards, such variants are, respectfully submitted contemplated by the claims below.

I claim:

1. A Small Game Holder comprising:
 a. a piece of string with two ends;
 b. a first knot tied with said two ends of said piece of string;
 c. an intermediate second knot tied in said piece of string forming a first loop between said first knot and said intermediate second knot and forming a second loop in said piece of string directly adjacent to said first loop;
 d. a plurality of compressible, movable small cord locks located along said first loop in said piece of string between said first knot and said intermediate second knot through which both sides of said first loop of said piece of string are threaded prior to the tying of said intermediate second knot.
 e. a third knot tied at the end of said second loop in said piece of string opposite to the end of said second loop that is characterized by the presence of said intermediate second knot.
 f. a compressible, movable small cord lock located along said second loop in said piece of string between said second intermediate knot end and said third knot.

2. The small game holder of claim 1 whereby said piece of string is of the composition of flexible wire.

3. The small game holder of claim 1 whereby said piece of string is of the composition of a twine material.

4. The small game holder of claim 1 whereby said piece of string is of the composition of rope material.

5. A method for constructing a small game holder consisting of the following steps, to wit:
 a. turning a piece of string upon itself to bring its two ends in apposition with one another;
 b. tying a first knot with the said two ends of said piece of string;
 c. tying an intermediate second knot in said piece of string forming a first loop between said first knot and said intermediate second knot and forming a second loop in said piece of string directly adjacent to said first loop;
 d. threading a plurality of compressible, movable small cord lock located along said first loop in said piece of string between said first knot and said intermediate second knot with both sides of said first loop of said piece of string prior to the tying of said intermediate second knot;
 e. tying a third knot at the end of said second loop in said piece of string opposite to the end of said second loop that is characterized the by presence of said intermediate second knot;
 f. threading a compressible, movable small cord lock located along said second loop in said piece of string between said second intermediate knot and said third knot with both sides of said second loop of said piece of string prior to tying of said third knot.

6. The method of claim 5 whereby said piece of string is of the composition of flexible wire.

7. The method of claim 5 whereby said piece of string is of the composition of twine material.

8. The method of claim 5 whereby said piece of string is of the composition of rope material.

* * * * *